(12) United States Patent
Peter et al.

(10) Patent No.: US 8,678,397 B2
(45) Date of Patent: Mar. 25, 2014

(54) SEALING ARRANGEMENT

(75) Inventors: Joerg Peter, Schönaich (DE);
Jean-Jacques Adolf, Cessy (FR);
Holger Jordan, Neuhausen (DE)

(73) Assignee: Trelleborg Sealing Solutions Germany GmbH, Stuttgart (DE)

( * ) Notice: Subject to any disclaimer, the term of this patent is extended or adjusted under 35 U.S.C. 154(b) by 437 days.

(21) Appl. No.: 12/732,477

(22) Filed: Mar. 26, 2010

(65) Prior Publication Data

US 2010/0230904 A1 Sep. 16, 2010

Related U.S. Application Data

(63) Continuation-in-part of application No. 10/551,006, filed on May 30, 2006, now abandoned.

(51) Int. Cl.
*F16J 15/32* (2006.01)
(52) U.S. Cl.
USPC .......................................................... 277/559
(58) Field of Classification Search
USPC .................. 277/438, 530, 567, 559
See application file for complete search history.

(56) References Cited

U.S. PATENT DOCUMENTS 5,127,661 A * 7/1992 Franson et al. ................ 277/552
5,791,658 A * 8/1998 Johnston ........................ 277/559
6,209,882 B1 * 4/2001 Riess ............................. 277/562
6,454,273 B1 * 9/2002 Kashima et al. ............... 277/437
2007/0132194 A1 * 6/2007 Kanda ........................... 277/559

FOREIGN PATENT DOCUMENTS

DE 4305891 A1 9/1994
JP S57-175858 U 11/1982

* cited by examiner

*Primary Examiner* — Vishal Patel
(74) *Attorney, Agent, or Firm* — Hackler Daghighian & Martino

(57) ABSTRACT

In a U-cup based seal of a rod, the basic body of the U-cup 3 is recessed relative to a square cross-sectional shape in the region of a radially inner outer edge 18 on the low pressure side in order to obtain a space 17 between the U-cup 3 and the opening, i.e. the passage opening 16 of a sealing gap 15, leading into a rectangular groove 4 guiding the U-cup 3. This space 17 remains at least partially also upon pressurization such that the U-cup 3 complete remains in the groove 4 upon pressurization and is not extruded into the sealing gap 15. This considerably reduces wear of the U-cup 3. An inner surface 24 of the U-cup shows liquid dragging bore reliefs formed as recesses 25 in the inner surface 24 of the U-cup 3 for transferring hydraulic liquid, disposed on a surface of the translatory movable machine part 1, from a low-pressure side N of the U-cup to a high-pressure side H of the U-cup 3 upon translatory movement of the movable machine part 1. The recesses 25 each extend in an axial direction from the low pressure side N of the U-cup towards the inner sealing lip 7 and each recess is radially confined by side walls 26 which converge in the direction of the inner sealing lip such as to form an imaginary intersection located beyond the inner sealing lip 7 on the high-pressure side of the U-cup 3.

6 Claims, 2 Drawing Sheets

SEALING ARRANGEMENT

The present application is a continuation-in-part of U.S. Ser. No. 10/551,006 filed Sep. 27, 2005.

BACKGROUND OF THE INVENTION

The invention concerns a sealing arrangement comprising a U-cup of a viscoplastic synthetic material, a stationary machine part, and a translatory movable machine part with an outer radius R, wherein the U-cup is disposed as a contracting joint under radial prestress between the stationary machine part and the movable machine part in a profiled section of and/or the stationary machine part, wherein the U-cup has a radially outer and a radially inner sealing lip on a high-pressure side, wherein the stationary and the movable machine parts are separated on a low-pressure side by a sealing gap width B, wherein an abutment surface of the U-cup abuts a radially oriented region of the profiled section on the low-pressure side, wherein the U-cup has an inner radius and an outer radius, wherein both in the unpressurized state and in the pressurized state, the inner radius of the U-cup in the region of the abutment surface is larger than the sum of R and B and wherein the U-cup comprises an inner surface facing the movable machine part, wherein the inner surface comprises several liquid dragging bore reliefs formed as recesses in the inner surface of the U-cup.

Sealing arrangements having U-cups are disclosed e.g. by H. K. Müller, "Abdichtung bewegter Maschinenteile" (Sealing of movable machine parts), Medienverlag Ursula Müller, Waiblingen 1990, pages 162 pp.

If a translatory movable machine part, e.g. a piston rod, shall be hydraulically moved in a stationary machine part, leakage of the force-transmitting hydraulic liquid, e.g. oil, must be prevented. For this purpose, U-cup rod seals are used in this connection.

A U-cup according to prior art consists substantially of a basic body with cuboid cross-section and two high-pressure side sealing lips. The U-cup rests firmly in a groove of the stationary machine part, wherein the groove generally has a rectangular cross-section. Hydraulic liquid may enter into the groove space from the high-pressure side from a gap between the movable and the stationary machine part. At least the radially outer sealing lip of the U-cup is supported on the groove bottom and at least its radially inner sealing lip is supported on the movable machine part, thereby subdividing the groove space and preventing spreading of the hydraulic liquid into the low-pressure part of the groove space.

When the hydraulic liquid is pressurized, the U-cup is subjected to external forces which press it to the groove walls and the movable machine part with an increased force, thereby increasing the sealing effect of the U-cup. However, more hydraulic fluid than necessary for an efficient seal as well as low wear of the U-cup adheres to the movable machine part and is dragged from the high-pressure side to the low-pressure side of the U-cup (beyond the inner sealing lip).

Accordingly, it is the underlying purpose of the present invention to provide a highly wear-resistant sealing arrangement on the basis of a U-cup rod seal with an overall reduced leakage of hydraulic fluid.

SUMMARY OF THE INVENTION

This object is achieved in accordance with the invention in a sealing arrangement according to claim 1.

The spatial configuration and alignment of the recesses in the inner surface of the U-Cup according to the invention improves backflow of hydraulic liquid from the low-pressure side of the U-cup to the high-pressure side of the U-cup across the inner sealing lip and thereby reduces the overall leakage rate In all pressure states, a separation between the end of the sealing gap facing the groove and an outer edge of the U-cup facing the sealing gap. Even upon pressurization of up to 400 bars, the U-cup remains completely in the groove (=profiled region of the stationary machine part) and is not extruded into the sealing gap. In cross-section, there always remains a space between the radially oriented region of the profiled section (i.e. the groove wall on the low-pressure side extending perpendicularly to the U-cup axis), the movable machine part and the U-cup. Thereby abrasion between the U-cup and the edges of the sealing gap and premature wear of the U-cup is greatly reduced.

The sealing gap width B is determined at the transition between the sealing gap and the profiled section of the stationary machine part on the low-pressure side N.

One embodiment of the inventive sealing arrangement is particularly preferred, wherein, in the unpressurized state, the inner radius of the U-cup decreases, in particular continuously, from the low pressure side N towards the inner sealing lip in a region around the abutment surface. With locally increasing axial separation between the abutment surface and the sealing gap, the U-cup approaches the movable machine part to ensure that the U-cup is as compact and stable as possible. A continuous progression prevents tension peaks in the U-cup upon pressurization, which could damage the U-cup through cracks or plastic deformation.

In a further development of this embodiment, in the unpressurized state, the inner radius of the U-cup decreases continuously, in particular like a cone, from a low-pressure side towards the inner sealing lip in a region from the abutment surface to the inner sealing lip. This produces additional space for deformation of the U-cup under pressurization. This prevents premature pressing of the U-cup against the movable machine section which would cause friction.

In another preferred embodiment, in the unpressurized state, an outer edge of the U-cup is formed convex, in particular like a circular arc, in a region facing the sealing gap. This enhances the backflow of hydraulic liquid into the high-pressure region.

In another preferred embodiment of the inventive sealing arrangement, the U-cup has an outer surface facing away from the movable machine part, wherein the outer surface is curved concavely in the unpressurized state to produce space for the U-cup to expand towards the groove bottom during pressurization. This prevents premature exertion of pressure by the U-cup on the movable machine section which would cause friction.

One embodiment is also advantageous, wherein, in the unpressurized state, the outer radius of the U-cup increases, in particular continuously, from the low-pressure side N towards the outer sealing lip in a region around the abutment surface. This provides space between the low-pressure side radially oriented region of the profiled section, the groove bottom and the outer edge of the U-cup which serves as expansion space for the U-cup when pressure is exerted. This also prevents a premature exertion of pressure by the U-cup on the movable machine section which would cause friction.

In another advantageous embodiment, the U-cup has an outer surface facing away from the movable machine part, and, in the unpressurized state, an outer edge of the U-cup is formed convex, in particular, like a circular arc, in the transition region between abutment surface and outer surface. The convex shape prevents tension peaks during deformation of the U-coup, in particular upon its abutment on the groove walls.

One embodiment of the inventive sealing arrangement is particularly preferred which is characterized in that the U-cup has an inner surface facing the movable machine part, the inner surface has several lubrication bore reliefs formed as recesses in the inner surface of the U-cup, and the radial depth of the recesses decreases from the low-pressure side of the U-cup towards the inner sealing lip. Due to a relative motion of the moved and the stationary machine part, small amounts of hydraulic liquid are dragged from the high-pressure region into the low-pressure region. The recesses an the inner surface improve the backflow of the hydraulic liquid into the high-pressure region and therefore reduce the leakage rate.

Finally, in an advantageous embodiment, the U-cup has an inner surface facing the movable machine part, and the inner surface has microstructures, in particular spherical calottes. This improves the capacity of dragging back hydraulic oil and prevents flat abutment of the U-cup and the movable machine part.

Further advantages of the invention can be extracted from the description and the drawing. The features mentioned above and below can be used in accordance with the invention either individuality or collectively in arbitrary combination. The embodiments shown and described are not to be understood as exhaustive enumeration but have exemplary character for describing the invention.

The invention is shown in the drawing and explained in more detail with reference to an embodiment.

DESCRIPTION OF THE PREFERRED EMBODIMENT

Figure 1:
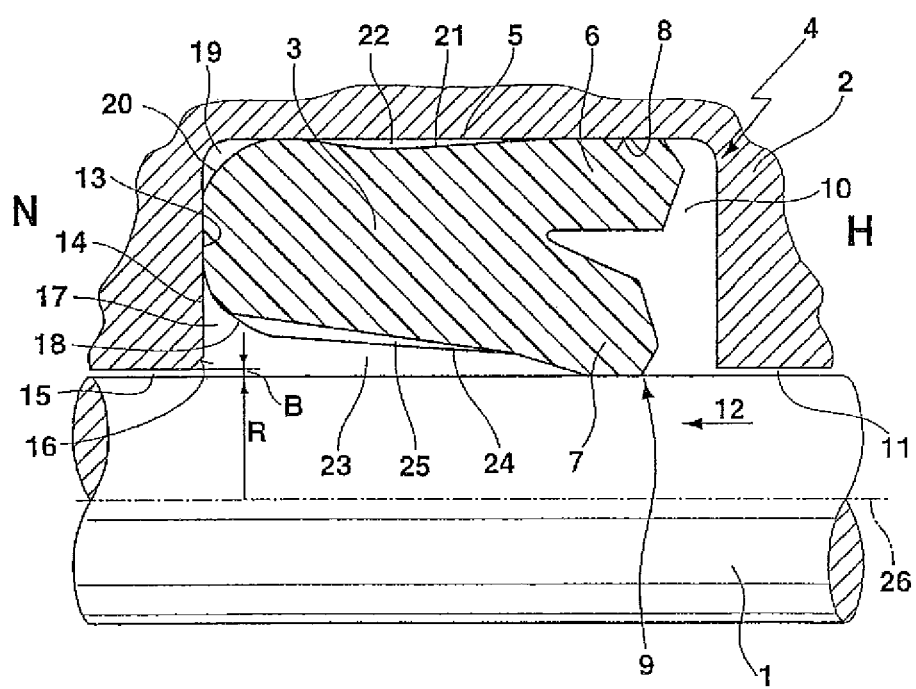
FIG. 1 shows a schematic cross-section of an embodiment of the inventive sealing arrangement with a U-cup of a viscoplastic synthetic material.

FIG. 1 shows a cross-section of an embodiment of an inventive sealing arrangement in the unpressurized (i.e. largely undeformed) state, comprising a movable machine part 1 which is herein formed as cylindrical piston rod, a stationary machine part 2 and a U-cup 3. The U-cup 3 is associated with an axis 26 with respect to which the U-cup 3 is approximately rotationally symmetrical. The axis 26 coincides with the cylindrical axis of the movable machine part 1. The stationary machine component 2 has a profiled section which is formed as groove 4 having a square cross-section. The U-cup 3 is disposed in the groove 4, wherein, due to radial prestress, i.e. pressure of the U-cup 3 against a groove bottom 5, a sliding motion of the U-cup 3 in the groove 4 is eliminated due to frictional adhesion. The U-cup 3 is formed from a viscoplastic synthetic material, such as polyurethane. On the high-pressure side (high-pressure side H, on the right hand side in the figure) the U-cup 3 has a radially outer sealing lip 6 and a radially inner sealing lip 7. The outer sealing lip 6 thereby presses on the groove bottom 5 in the region 8. The inner sealing lip 7 presses, in particular with the sealing edge 9, on the movable machine part 1. A high-pressure part 10 of the groove 4 is thereby separated from the remaining part of the groove 4. The high-pressure side part 10 is filled with a hydraulic liquid which can flow through a useful gap 11 into the high-pressure side part 10 of the groove 4. The hydraulic liquid produces a pressure of between 0 and 400 bar on the high-pressure side H. This pressure can displace the movable machine part 1 in the direction of the arrow 12. At the same time, the pressure of the hydraulic liquid is also applied to the outer edges of the U-cup 3 which face the high-pressure side part 10 of the groove 4, by means of which the U-cup 3 can be deformed.

At atmospheric pressure, an abutment surface 13 of the U-cup 3 abuts a radially oriented region 14 of the groove 4 on the low-pressure side (low-pressure side N on the left-hand side in the figure). The radially oriented region 14 is a side wall of the groove 4 in this case. The abutment surface 13 covers only a central part of the radially oriented region 14.

The movable machine part 1 and the stationary machine part 2 are separated by a sealing gap 15 on the low-pressure side. The sealing gap 15 is associated with a sealing gap width B which designates the separation between the movable and the stationary machine part. In addition to the sealing gap width B, the edge on the low-pressure side groove side is broken, chamfered. This produces a passage opening 16 in the groove 4 which leads to the sealing gap 15. It is to be noted that the passage opening 16 is actually a three-dimensional annular gap.

If the sealing gap 15 is enlarged at its opening into the groove 4 via a passage opening 16, the inventive U-cup 3 is preferably designed such that it has a larger inner radius in the region of the abutment surface 13 than the sum of R, B and the enlargement generated by the passage opening 16 in the unpressurized and also in the pressurized state. The enlargement is the radial extension of the inclined surface from the passage opening 16.

In accordance with the invention, the passage opening 16 is not covered, in particular not even partially, by the U-cup 3, neither in the shown unpressurized state nor in the pressurized state when the U-cup 3 is deformed. In the region of abutment on the radially oriented region 14, the lower edge of the U-cup 3, i.e. the radially inner edge of the abutment surface 13, is disposed radially further outwards (at the top in the figure) than the radially outer edge of the passage opening 16. With other words, the inner radius of the U-cup 4 in the region of the abutment surface 13 is larger than the sum of the outer radius R of the movable machine part 1 and the sealing gap width B plus the enlargement. A space 17 remains between the outer edge 18 of the U-cup 3 facing the sealing gap 15 and the passage opening 16. The outer edge 18 of the U-cup 3 has the shape of a circular arc. The space 17 prevents bulging of the U-cup 3 into the passage opening 16 or even deeper into the sealing gap 15 at the predetermined maximum pressure of approximately 400 bar, which reduces wear or damage to the U-cup 3.

In the unpressurized state, a further space 19 is provided in the transition region of the radially oriented region 14 of the groove 4 and groove bottom 5 relative to an opposite outer edge 20 of the U-cup 3. The outer edge 20 is set back relative to the groove walls to provide an expansion space in case of pressurization. The expansion of the U-cup 3 into this space 19 is advantageous since it reduces the pressure of the U-cup 3 onto the movable machine part 1 close to the low-pressure side N, thereby reducing friction in case the rod is extended (=the movable machine part 1 moves in the direction of arrow 12). The outer edge 20 of the U-cup 3 is curved in the shape of a circular arc.

An outer surface 21 of the U-cup 3 facing the groove bottom 5 has a concave curvature which also generates a space 22 between the outer surface 21 of the U-cup 3 and the groove bottom 5.

A further space 23 is provided through a conical extension of an inner surface 24 of the U-cup 3 facing the movable machine part 1. This space 23 serves as an expansion chamber for the U-cup 3 to reduce pressure on the movable machine part 1, and on the other hand, the space 23 also merges into the space 17, thereby preventing the U-cup 3 from entering (extrusion) into the passage opening 16.

In a U-cup based seal of a rod, the basic body of the U-cup 3 is recessed relative to a rectangular cross-sectional shape in the region of a radially inner side outer edge 18 on the low pressure side in order to obtain a space 17 between the U-cup 3 and the opening, i.e. the passage opening 16 of a sealing gap 15, leading into a rectangular groove 4 guiding the U-cup 3. This space 17 remains at least partially even upon pressurization such that the U-cup 3 remains completely in the groove 4 when pressure is exerted and is not extruded into the sealing gap 15. This considerably reduces wear or defects of the U-cup 3.

If the movable machine part 1 is moved against the direction of arrow 12, hydraulic liquid disposed on the surface of the movable machine part 1 shall be dragged from the low pressure region N to the high-pressure region H of the U-cup. To support this behavior, the inner surface 24 of the U-cup 3 has recesses 25 as lubrication bore reliefs which are disposed at regular intervals along the inner periphery of the U-cup 3. These recesses 25 have depths which decrease in the direction towards the high-pressure side H of the U-cup.

Figure 2:
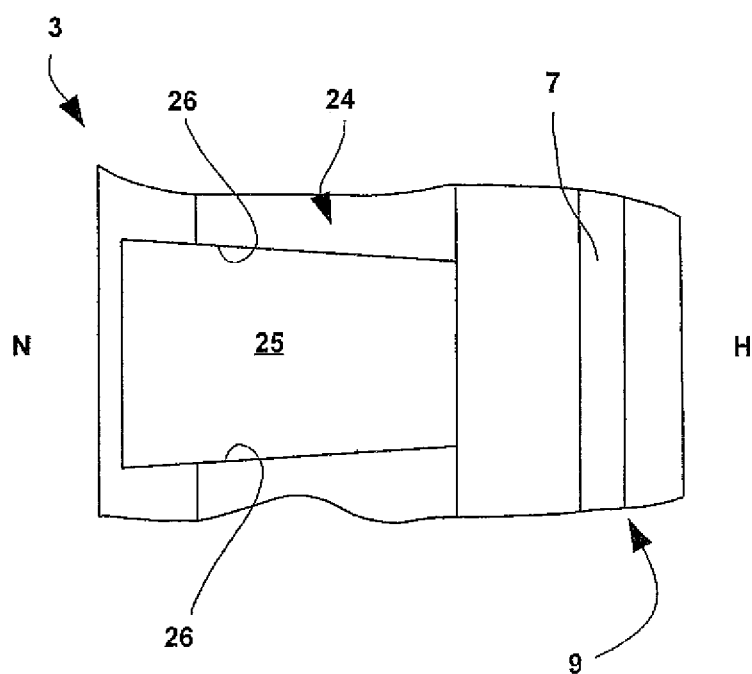
FIG. 2 is an expanded partial view of an inner surface of the U-cup as shown in FIG. 1 developed from a cylindrical surface to a flat plane.

Referring now to FIG. 2, there is shown an expanded partial view of the inner surface 24 of the U-cup 3 as shown in FIG. 1 developed from a basically cylindrical surface to a basically flat plane. As can be seen there, each recess 25 is radially confined by side walls 26 that are radially spaced apart from each other and which converge in the direction of the inner sealing lip 7 towards an imaginary intersection located beyond the inner sealing lip on the high-pressure side H of the U-cup 3.

The recesses 25 thereby overall show a cross sectional area that decreases towards the inner sealing lip 7 and the sealing edge 9 of the U-cup 3, thus forming a nozzle-type guidance for the hydraulic liquid disposed on the surface of the movable machine part 1 on the low-pressure side N of the U-cup. When the movable part 1 is moved opposite to the direction 12 (FIG. 1, guidance of the hydraulic liquid is such that a dynamic/static pressure buildup of the hydraulic liquid optimally effects the inner sealing lip 7 and the sealing edge, respectively, such that bending and/or lifting of the inner sealing lip 7/sealing edge 9 off the movable machine part 1 facilitates passage of the hydraulic liquid to the high-pressure side H of the U-cup.

We claim:

1. Sealing arrangement comprising a U-cup of a viscoplastic synthetic material, a stationary machine part, and a translatory movable machine part with an outer radius R, wherein the U-cup is disposed as a contracting joint under radial prestress between the stationary machine part and the movable machine part in a profiled section of the stationary machine part, wherein the U-cup has a radially outer and a radially inner sealing lip on a high-pressure side, wherein the stationary and the movable machine parts are separated on a low-pressure side by a sealing gap width B, wherein an abutment surface of the U-cup abuts a radially oriented region of the profiled section on the low-pressure side, wherein the U-cup has an inner radius and an outer radius, wherein both in the unpressurized state and in the pressurized state, the inner radius of the U-cup in the region of the abutment surface is larger than the sum of R and B and wherein the U-cup comprises an inner surface facing the movable machine part and extending from the region of the abutment surface of the U-cup to a sealing edge of the inner sealing lip, wherein the inner surface comprises several liquid dragging bore reliefs formed as recesses in the inner surface of the U-cup for transferring hydraulic liquid, disposed on a surface of the translatory movable machine part, from a low-pressure side N of the U-cup to a high-pressure side H of the U-cup upon translatory movement of the movable machine part, wherein the recesses each extend in an axial direction from the low pressure side N of the U-cup towards the inner sealing lip and wherein each recess is radially confined by side walls which converge in the direction of the inner sealing lip such as to form an imaginary intersection located beyond the inner sealing lip on the high-pressure side of the U-cup, wherein further the radial depth of the individual recesses decreases from the low- pressure-side N of the U-cup towards the inner sealing lip, the recesses, as well as an inner surface region with the recesses, being spaced apart from the movable machine part and the sealing lip in an unpressurized state, where in the inner surface with the recess is spaced away from the outer radius R in the unpressurized state and the pressurized state, wherein the U-cup has an outer concave surface adjacent a groove bottom in the unpressurized state.

2. Sealing arrangement according to claim 1 wherein in an unpressurized state, an inner radius of the U-cup seal decreases continuously from the low-pressure side towards the inner sealing lip.

3. Sealing arrangement according to claim 2, wherein in the unpressurized state, the inner radius of the U-cup seal conically decreases from the low-pressure side towards the inner sealing.

4. Sealing arrangement according to claim 1 wherein in an unpressurized state, the abutment surface of the U-cup seal is, in part, convex.

5. Sealing arrangement according to claim 1 wherein in an unpressurized state, an outer radius of the U-cup seal increases from the low-pressure side towards the outer sealing lip.

6. Sealing arrangement according to claim 1 wherein the U-cup seal has an outer surface facing away from the movable piston and that in an unpressurized state, an outer edge of the U-cup seal is formed convex in a transition region between abutment surface and outer surface.

* * * * *